US010777351B2

(12) United States Patent
Son et al.

(10) Patent No.: US 10,777,351 B2
(45) Date of Patent: Sep. 15, 2020

(54) COMPLEX ELECTRONIC COMPONENT

(71) Applicant: SAMSUNG ELECTRO-MECHANICS CO., LTD., Suwon-si, Gyeonggi-do (KR)

(72) Inventors: Soo Hwan Son, Suwon-si (KR); Ho Yoon Kim, Suwon-si (KR); Man Su Byun, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 533 days.

(21) Appl. No.: 15/381,532

(22) Filed: Dec. 16, 2016

(65) Prior Publication Data

US 2017/0346279 A1 Nov. 30, 2017

(30) Foreign Application Priority Data

May 30, 2016 (KR) ........................ 10-2016-0066799

(51) Int. Cl.
*H02H 9/00* (2006.01)
*H01F 27/40* (2006.01)
*H01F 17/00* (2006.01)

(52) U.S. Cl.
CPC ....... *H01F 27/402* (2013.01); *H01F 17/0013* (2013.01); *H01F 2017/008* (2013.01)

(58) Field of Classification Search
CPC .............................. H02H 9/045; H01F 27/402
(Continued)

(56) References Cited

U.S. PATENT DOCUMENTS 8,238,069 B2 * 8/2012 Adachi ..................... H01T 4/12 361/56
8,243,406 B2 * 8/2012 Asakura .................... H01T 4/08 361/118

(Continued)

FOREIGN PATENT DOCUMENTS

JP 2000-114005 A 4/2000
KR 10-2009-0034305 A 4/2009

(Continued)

OTHER PUBLICATIONS

Korean Office Action issued in corresponding Korean Application No. 10-2017-0049917, dated Jun. 15, 2017; with English translation.

*Primary Examiner* — Jared Fureman
*Assistant Examiner* — Lucy M Thomas
(74) *Attorney, Agent, or Firm* — Morgan, Lewis & Bockius LLP

(57) ABSTRACT

A complex electronic component includes a body including a first external electrode and a second external electrode, disposed on an external surface thereof and a laminate; a plurality of first electrodes and a plurality of second electrodes, disposed in the laminate and electrically connected to the first external electrode and the second external electrode, respectively; a third electrode and a fourth electrode, disposed on the laminate to be spaced apart from each other and electrically connected to the first external electrode and the second external electrode, respectively; and an ESD discharge layer disposed between the third electrode and the fourth electrode. In addition, a distance between the third electrode and the fourth electrode is within a range of 30 μm to 60 μm.

15 Claims, 7 Drawing Sheets

I - I'

(58) Field of Classification Search
USPC ........................................................ 361/15, 56
See application file for complete search history.

(56) References Cited

U.S. PATENT DOCUMENTS

| | | | |
|---|---|---|---|
| 2009/0067113 A1 | 3/2009 | Urakawa | |
| 2012/0300355 A1 | 11/2012 | Umeda et al. | |
| 2014/0232485 A1 * | 8/2014 | Bultitude ................. | H01G 4/30 333/175 |
| 2015/0140201 A1 | 5/2015 | Adachi et al. | |
| 2015/0340154 A1 | 11/2015 | Kim et al. | |

FOREIGN PATENT DOCUMENTS

| | | |
|---|---|---|
| KR | 10-2012-0132365 A | 12/2012 |
| KR | 10-2015-0135909 A | 12/2015 |

* cited by examiner

COMPLEX ELECTRONIC COMPONENT

CROSS-REFERENCE TO RELATED APPLICATION

This application claims the benefit of priority to Korean Patent Application No. 10-2016-0066799, filed on May 30, 2016 with the Korean Intellectual Property Office, the entire disclosure of which is incorporated herein by reference.

TECHNICAL FIELD

The present disclosure relates to a complex electronic component, and in more detail, to a complex electronic component having excellent durability so as to withstand electrostatic discharge (ESD).

BACKGROUND

Since a tendency to use metallic cases having conductivity in electronic devices has recently increased, there has been a growing need to prevent electric shorts from occurring in the interior and an electrical charge being transferred to the exterior of electronic devices.

In detail, there are an increasing number of cases in which the front surface of a portable electronic device is manufactured using a metal frame in order to improve the aesthetic properties and strength thereof. Therefore, there is an increased demand for a method to protect electronic components in the interior of electronic devices from being affected by an ESD on the exterior thereof or to protect users from receiving an electric shock caused by an internal power defect.

However, due to the miniaturization and integration of portable electronic devices, additional ESD protection devices or electric shock prevention devices have been difficult to provide.

SUMMARY

An aspect of the present disclosure provides a complex electronic component including an electrostatic discharge (ESD) protection portion having a vertically stacked structure and having excellent durability so as to withstand static electricity.

According to an aspect of the present disclosure, a complex electronic component comprises a body including a first external electrode and a second external electrode, disposed on an external surface thereof and a laminate; a plurality of first electrodes and a plurality of second electrodes, disposed in the laminate and electrically connected to the first external electrode and the second external electrode, respectively; a third electrode and a fourth electrode, disposed on the laminate to be spaced apart from each other and electrically connected to the first external electrode and the second external electrode, respectively; and an ESD discharge layer disposed between the third electrode and the fourth electrode. In addition, a distance between the third electrode and the fourth electrode is within a range of 30 μm to 60 μm.

According to an aspect of the present disclosure, a complex electronic component comprises a laminate including a first external electrode and a second external electrode, disposed on an external surface of the laminate; a first discharge electrode and a second discharge electrode, disposed on an upper surface of the laminate, connected to the first external electrode and the second external electrode, respectively, and disposed to be spaced apart from each other; an ESD discharge layer disposed between the first discharge electrode and the second discharge electrode; and a cover layer disposed to cover an upper portion of the laminate.

BRIEF DESCRIPTION OF THE DRAWINGS

The above and other aspects, features, and advantages of the present disclosure will be more clearly understood from the following detailed description taken in conjunction with the accompanying drawings, in which:

FIG. 4 is a perspective view of a complex electronic component according to an exemplary embodiment, while FIG. 6 is a perspective view of a complex electronic component according to an exemplary embodiment, while

DETAILED DESCRIPTION

Figure 1:
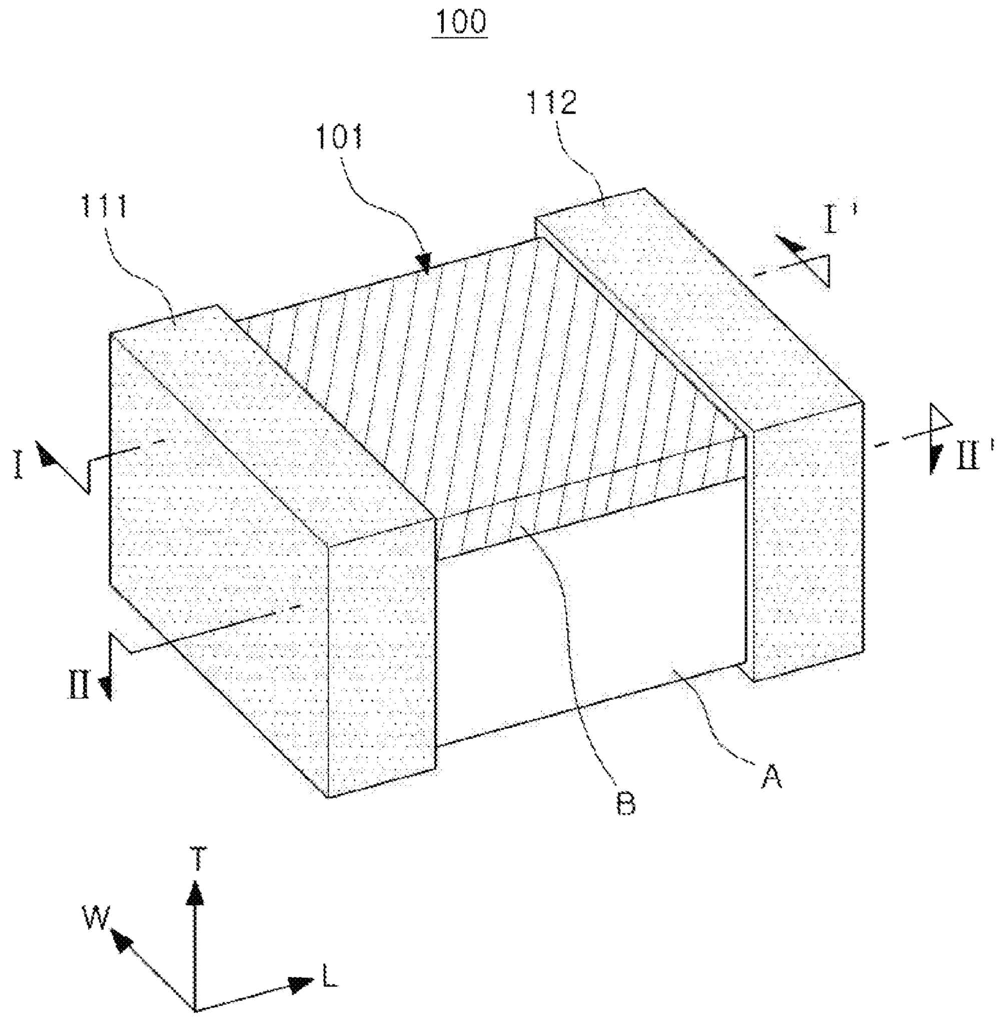
FIG. 1 is a schematic perspective view of a complex electronic component according to an exemplary embodiment.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

A device portion of a complex electronic component of the present disclosure may be provided as a capacitor, an inductor, or a thermistor, but is not limited thereto.

However, in the present disclosure, a capacitor will be described as an example, in order to clarify a description thereof.

FIG. 1 is a schematic perspective view of a complex electronic component 100 according to an exemplary embodiment.

With reference to FIG. 1, a complex electronic component, according to an exemplary embodiment, may include a body having a device portion A and an ESD protection portion B as well as a first external electrode 111 and a second external electrode 112, disposed on an external surface of the body.

The first external electrode 111 and the second external electrode 112 may be disposed on opposing surfaces of the body in a length direction.

The first external electrode 111 and the second external electrode 112 may include a plurality of metal layers.

In detail, the first external electrode 111 and the second external electrode 112 may include a first metal layer formed using a conductive paste including silver (Ag), nickel (Ni), or the like and a second metal layer and a third metal layer, formed using a plating process.

The first external electrode 111 and the second external electrode 112 may be electrically connected to a first electrode 121 and a second electrode 122, to be subsequently described, and may be electrically connected to a third electrode 131 and a fourth electrode 132.

Figure 2:
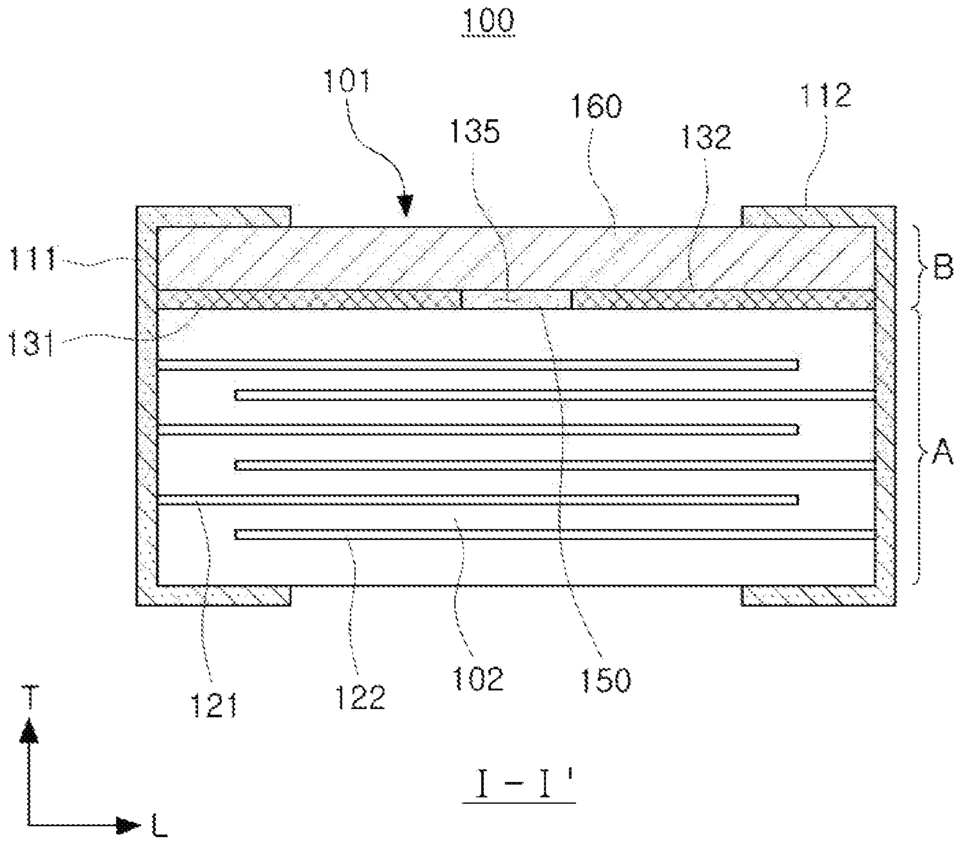
FIG. 2 is a cross-sectional view taken along line I-I' of FIG. 1 and a schematic cross-sectional view of a complex electronic component according to an exemplary embodiment.

FIG. 2 is a cross-sectional view taken along line I-I' of FIG. 1 and a schematic cross-sectional view of a complex electronic component according to a first exemplary embodiment. In addition, FIG. 3 is a top view taken along line II-II' of FIG. 1 and a schematic top view of a complex electronic component according to an exemplary embodiment.

Figure 3:
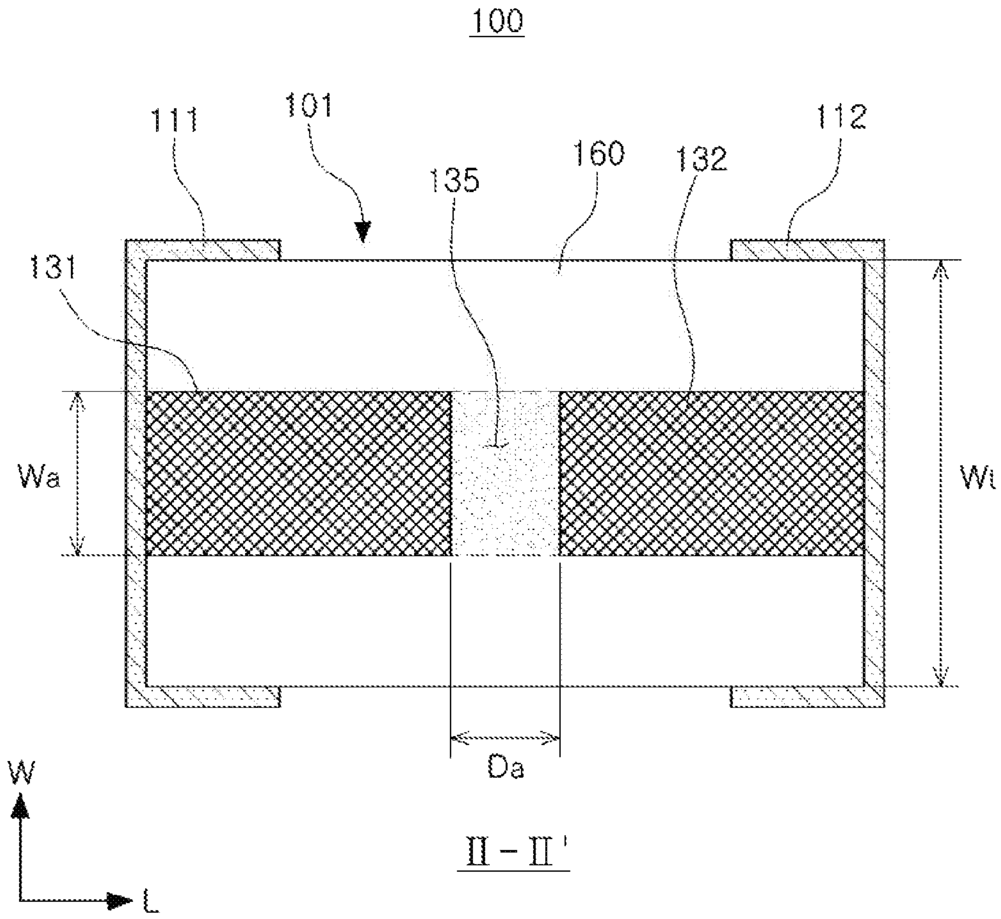
FIG. 3 is a top view taken along line II-II' of FIG. 1 and a schematic top view of a complex electronic component according to an exemplary embodiment.

With reference to FIGS. 2 and 3, a complex electronic component 100, according to the first exemplary embodiment, may include a device portion A and an ESD protection portion B.

The device portion A may include a laminate 101 and a first electrode 121 and a second electrode 122, disposed in the laminate 101.

The laminate 101 may be provided as a plurality of dielectric layers 102, including a ferroelectric material, which are stacked, compressed, and sintered. In addition, each layer of the plurality of dielectric layers 102 may be integrated, so that each layer thereof may be indiscernible to the naked eye.

A dielectric layer 102 may be formed using a material having a perovskite structure, such as barium titanate ($BaTiO_3$), a ferroelectric material. However, in a case in which the device portion A is provided as an inductor, a magnetic material may be used. In a case in which the device portion A is provided as a thermistor, a material having properties in which a resistance thereof is changed depending on a temperature may be used.

The laminate 101 may include a plurality of first electrodes 121 and second electrodes 122, disposed therein.

The first electrode 121 and the second electrode 122 may be formed in such a manner that a conductive paste including a conductive material is printed on a dielectric layer. However, in the case of an inductor, the first electrode 121 and the second electrode 122 may be provided as an electrode having a coil form.

A conductive material used in the first electrode 121 and the second electrode 122 may be provided as one selected from Ni, copper (Cu), Ag, and the like, but is not limited thereto.

The ESD protection portion B may be disposed on a surface of the device portion A, for example, an upper surface of the device portion A.

The ESD protection portion B may include an ESD discharge layer 150, a cover layer 160, a third electrode 131, and a fourth electrode 132.

The cover layer 160 may be disposed in an upper portion of the ESD protection portion B, and may include an insulating material. Since the cover layer 160 includes an insulating material, contact with a metal can may not have an influence on an upper portion of the complex electronic component 100. Therefore, positional freedom may be increased in a case in which a printed circuit board (PCB) is designed.

The third electrode 131 may refer to a first discharge electrode, while the fourth electrode 132 may refer to a second discharge electrode.

The third electrode 131 and the fourth electrode 132 may be formed in such a manner that a conductive paste including Ag or Cu is printed.

However, in a case in which the third electrode 131 and the fourth electrode 132 are formed using a conductive paste, the third electrode 131 and the fourth electrode 132 may be damaged at a temperature of 700° C. or higher in a sintering process among processes of manufacturing the complex electronic component 100. Therefore, the third electrode 131 and the fourth electrode 132 may be formed using an Ag-epoxy or a Cu-epoxy. The Ag-epoxy or the Cu-epoxy may refer to an epoxy resin including conductive powder.

A gap 135 may be disposed between the third electrode 131 and the fourth electrode 132. The gap 135 may be provided as a rectangle including end portions of the third electrode 131 and the fourth electrode 132 as opposing sides.

In other words, the gap 135 may refer to a portion in which the third electrode 131 and the fourth electrode 132 are disposed to be spaced apart from each other. Therefore, a length of the gap 135 may refer to a distance between the third electrode 131 and the fourth electrode 132.

The ESD discharge layer 150 may be disposed in the gap 135, that is, between the third electrode 131 and the fourth electrode 132.

The ESD discharge layer 150 may be formed using a paste for ESD in which at least one metal particle among Ag, Cu, Ni, and palladium (Pd) is mixed with at least one ceramic material of a silicon dioxide ($SiO_2$) and zinc peroxide ($ZnO_2$).

The ESD discharge layer 150 may have insulating properties at a voltage limit or lower. However, in a case in which a voltage higher than the voltage limit is applied thereto, an electric current may flow through a metal particle included in the ESD discharge layer 150.

The voltage limit may be controlled through a content of a metal particle included in the ESD discharge layer 150.

In other words, the ESD discharge layer 150 may be disposed in the gap 135. Therefore, the device portion A may be prevented from being damaged, in a case in which static electricity or overvoltage, higher than the voltage limit, is applied thereto, an electric current flows between the third electrode 131 and the fourth electrode 132, and static electricity or overvoltage is applied to the device portion A.

In a case in which static electricity or overvoltage flows through the third electrode 131 once, the fourth electrode 132, or the ESD discharge layer 150, the third electrode 131, the fourth electrode 132, or the ESD discharge layer 150 may withstand static electricity or overvoltage. However, in a case in which a phenomenon described above is repeated several times, the third electrode 131, the fourth electrode 132, or the ESD discharge layer 150 may be damaged.

Therefore, the capability in which the third electrode 131, the fourth electrode 132, or the ESD discharge layer 150 withstands static electricity or overvoltage several times may be referred to as durability. In addition, durability may need to be increased.

Table 1 below illustrates measures of turn-on characteristics and ESD durability according to a length (Da) of a gap, in a case in which a ratio (Wa/Wt) of a line width (Wa) of the third electrode 131 and the fourth electrode 132 with respect to a width (Wt) is more than 0.2 and less than 0.5.

TABLE 1

| Exemplary Embodiment | Da (μm) | Turn-on Characteristics | ESD Durability |
|---|---|---|---|
| 1 | 10 | ○ | x |
| 2 | 30 | ◎ | ◎ |
| 3 | 40 | ◎ | ◎ |
| 4 | 60 | ○ | ○ |
| 5 | 80 | x | x |

Turn-on characteristics may refer to characteristics in which an electric current flows in an ESD protection portion when a voltage higher than a specific voltage (400V) is applied thereto. In addition, ESD durability may refer to a measure of a defect in the ESD protection portion after ESD is applied thereto under IEC-61000-4-2 Level 4 standard (8 kV), 100 times.

With reference to Table 1, in order to secure excellent turn-on characteristics and high ESD durability, the third electrode 131 and the fourth electrode 132 may be disposed so that a length (Da) of the gap 135 may be within a range of 30 μm to 60 μm.

In detail, in a case in which the ratio (Wa/Wt) of the line width (Wa) of the third electrode 131 and the fourth electrode 132 with respect to a width (Wt) of the body is more than 0.2 and less than 0.5, and the length (Da) of the gap 135 is within a range of 30 μm to 60 μm, the complex electronic component, according to an exemplary embodiment, may have excellent turn-on characteristics and high ESD durability.

In a case in which the length (Da) of the gap 135 is less than 30 μm, durability so as to withstand a high voltage repeatedly applied to the ESD discharge layer 150 or static electricity may be reduced, as illustrated in Exemplary Embodiment 1. In a case in which the length (Da) of the gap 135 is greater than 60 μm, a minimum voltage at which a high voltage or static electricity may be discharged may be increased. Therefore, turn-on characteristics may be degraded. In detail, a reaction to a high voltage or static electricity may be irregular.

Table 2 below illustrates measures of turn-on characteristics and ESD durability, according to the ratio (Wa/Wt) of the line width (Wa) of the third electrode 131 and the fourth electrode 132 with respect to the width (Wt), in a case in which the length (Da) of the gap 135 is greater than 30 μm and less than 60 μm.

TABLE 2

| Exemplary Embodiment | Wa/Wt | Turn-on Characteristics | ESD Durability |
|---|---|---|---|
| 6 | 0.1 | x | x |
| 7 | 0.2 | ○ | ○ |
| 8 | 0.4 | ◎ | ◎ |
| 9 | 0.5 | ○ | ○ |
| 10 | 0.6 | x | ○ |

With reference to FIG. 2, in a case in which the ratio (Wa/Wt) of the line width (Wa) of the third electrode 131 and the fourth electrode 132, with respect to the width (Wt) of the body, is formed to be 0.2 to 0.5, the complex electronic component, according to an exemplary embodiment, may have excellent turn-on characteristics and high ESD durability.

In other words, in a case in which Wa/Wt is more than 0.5, turn-on characteristics are likely to be degraded by short circuits. In a case in which Wa/Wt is less than 0.2, reactivity to a high voltage or static electricity may be reduced. Therefore, there may be a problem in which turn-on characteristics are degraded, and durability is also reduced.

Therefore, the complex electronic component, according to an exemplary embodiment, may have excellent turn-on characteristics and high ESD durability in such a manner that the ratio (Wa/Wt) of the line width (Wa) of the third electrode 131 and the fourth electrode 132, with respect to the width (Wt) of the body, is formed to be 0.2 to 0.5.

Table 3 illustrates measures of turn-on characteristics and ESD durability according to a content of a ceramic particle, in a case in which a content of a metal particle is greater than 37 wt % and less than 48 wt % in an ESD discharge layer.

TABLE 3

| Exemplary | Content of Ceramic Particle (wt %) | | | Turn-on | ESD |
|---|---|---|---|---|---|
| Embodiment | $SiO_2$ | $ZnO_2$ | Total | Characteristics | Durability |
| 11 | 7.5 | 0 | 7.5 | ◎ | ○ |
| 12 | 12.0 | 0 | 12.0 | ○ | ○ |
| 13 | 17.0 | 0 | 17.0 | x | x |
| 14 | 7.5 | 5.0 | 12.5 | ○ | ○ |
| 15 | 10.0 | 5.0 | 15.0 | x | x |

With reference to FIG. 3, in a case in which the ESD discharge layer contains 7.5 wt % to 12.5 wt % of a ceramic particle, based on a total weight of the ESD discharge layer, the complex electronic component, according to an exemplary embodiment, may have excellent turn-on characteristics and high ESD durability.

In a case in which the ESD discharge layer contains less than 7.5 wt % of a ceramic particle, uniformity of a form of the ESD discharge layer is difficult to maintain. Therefore, there may be a problem in which ESD durability is reduced by non-uniformity of the form of the ESD discharge layer. In addition, in a case in which uniformity of the form of the ESD discharge layer is not maintained, there may be a problem in which discharge characteristics of ESD are not uniform.

In a case in which the ESD discharge layer contains greater than 12.5 wt % of the ceramic particle, there may be a problem in which turn-on characteristics and ESD durability are degraded, simultaneously.

Therefore, the complex electronic component, according to an exemplary embodiment, may have excellent turn-on characteristics and high ESD durability in such a manner that the ESD discharge layer contains 7.5 wt % to 12.5 wt % of the ceramic particle.

In detail, in a case in which $SiO_2$ or $ZnO_2$ is used as the ceramic particle, there may not be a significant difference in results illustrated in Table 3. It could be determined that turn-on characteristics and ESD durability are affected by the content of the ceramic particle. Therefore, in a case in which a ceramic particle having properties similar to that of $SiO_2$ or $ZnO_2$, besides $SiO_2$ or $ZnO_2$, is used, the same result is expected to be produced.

Figure 4:
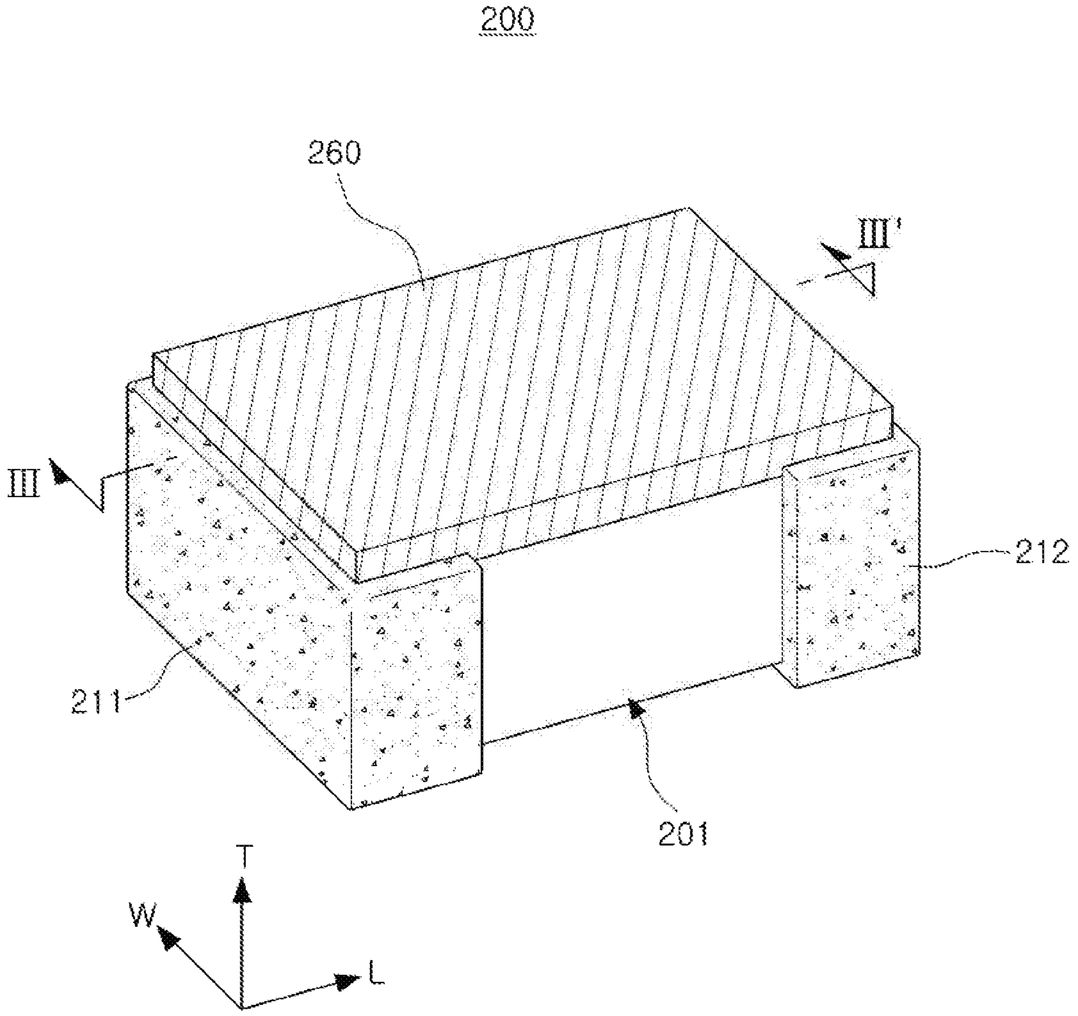
Figure 5:
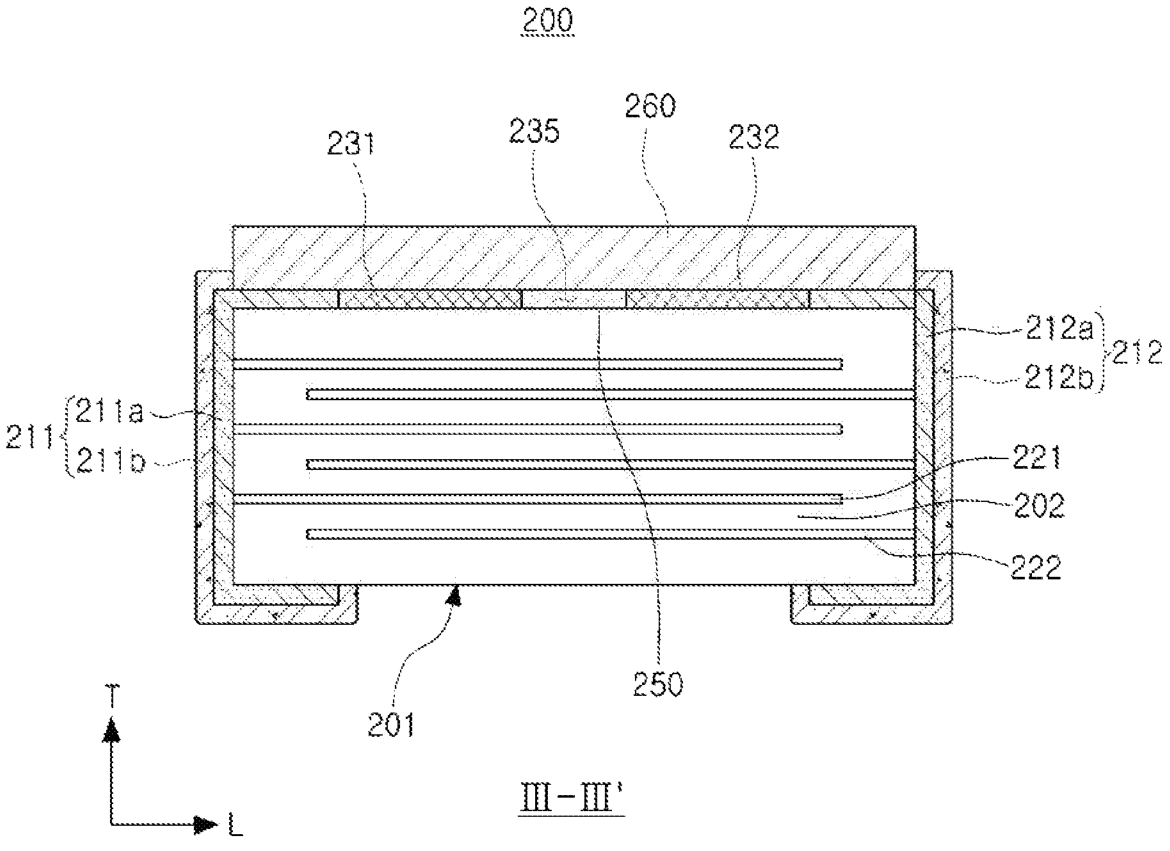
FIG. 5 is a cross-sectional view taken along line III-III' of FIG. 4.

FIG. 4 is a perspective view of a complex electronic component 200 according to another exemplary embodiment, while FIG. 5 is a cross-sectional view taken along line III-III' of FIG. 4.

A description of a composition of a complex electronic component 200, according to a different exemplary embodiment, the same as that of a complex electronic component 100, according to the exemplary embodiment described above, will be omitted.

With reference to FIGS. 4 and 5, the complex electronic component 200, according to a different exemplary embodiment in the present disclosure, may include a laminate 201 having a first external electrode 211 and a second external electrode 212, disposed on an external surface thereof, a first discharge electrode 231 and a second discharge electrode 232, disposed on an upper surface of the laminate 201, connected to the first external electrode 211 and the second external electrode 212, respectively, and disposed to be spaced apart from each other, an ESD discharge layer 250 disposed between the first discharge electrode 231 and the second discharge electrode 232, and a cover layer 260 disposed to cover an upper portion of the laminate 201.

The laminate 201 may be provided as a plurality of dielectric layers 202, including a ferroelectric material, which are stacked, compressed, and sintered. The laminate 201 may include a plurality of first electrodes 221 and second electrodes 222, disposed therein.

A gap 235 may be disposed between the first discharge electrode 231 and the second discharge electrode 232. The ESD discharge layer 250 may be disposed in the gap 235, that is, between the first discharge electrode 231 and the second discharge electrode 232.

The first external electrode 211 and the second external electrode 212 may include lowermost electrode layers 211*a* and 212*a* and plating layers 211*b* and 212*b* formed using the lowermost electrode layers 211*a* and 212*a* as a seed layer.

The complex electronic component 200, according to the present exemplary embodiment, may include the lowermost electrode layers 211*a* and 212*a* to cover opposing surfaces of the laminate 201 in a length direction, and may include the first discharge electrode 231 and the second discharge electrode 232 on the laminate 201. Subsequently, the cover layer 260 may be disposed to cover the upper portion of the laminate 201, and the plating layers 211*b* and 212*b* may be formed using a plating process. Therefore, in a complex electronic component according to the present exemplary embodiment, the plating layers 211*b* and 212*b* may be disposed in a portion exposed outwardly of the first external electrode 211 and the second external electrode 212. In addition, the plating layers 211*b* and 212*b* may not be formed in a region in which the cover layer 260 is in contact with the laminate 201.

In the complex electronic component 200 according to the present exemplary embodiment, since the cover layer 260 acting as a protective layer is disposed on an upper surface of a final product, contact with a metal can may not have an influence on an upper surface thereof. Therefore, positional freedom may be increased in a case in which a PCB is designed.

In addition, after a laminate used as a device portion is completed, a complex electronic component including an ESD protection portion using a simple additional process may be manufactured.

Figure 6:
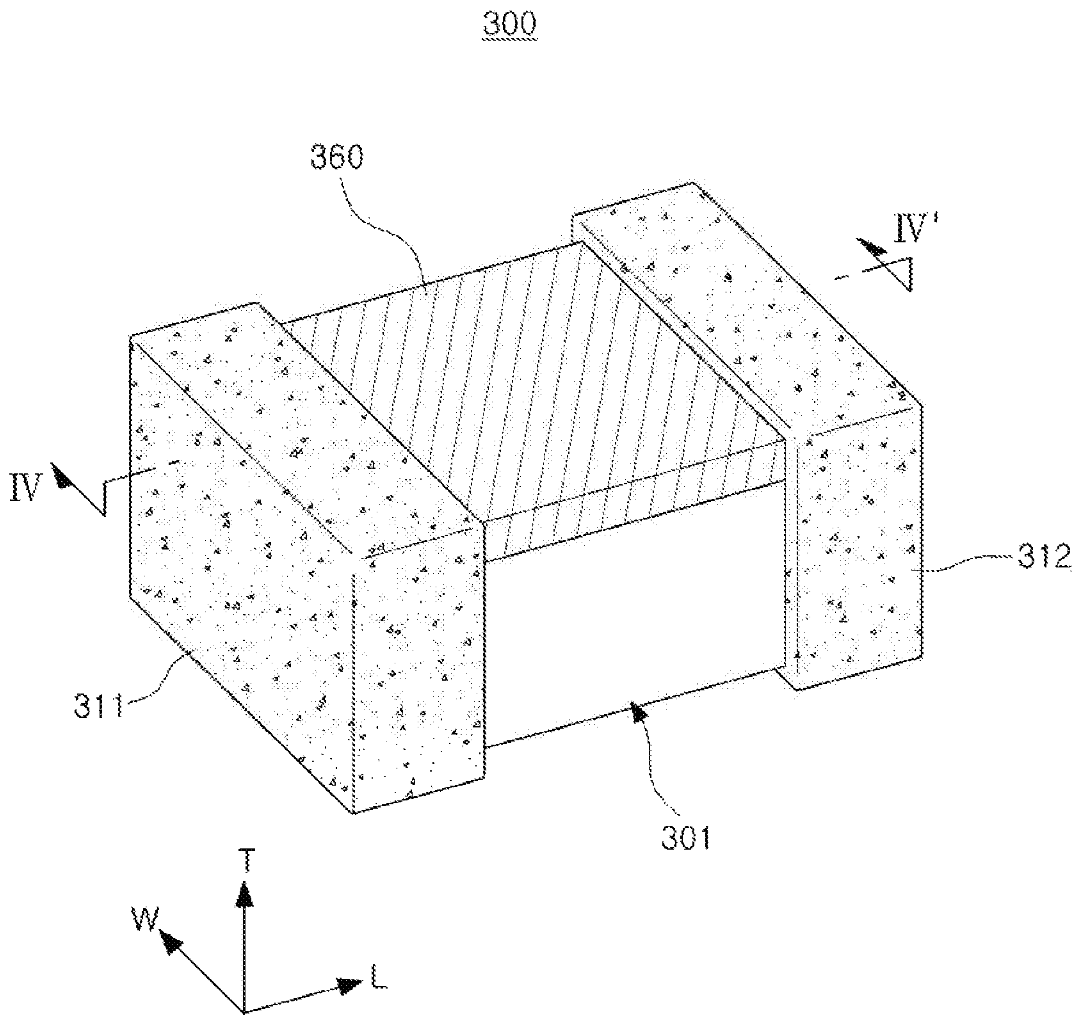
Figure 7:
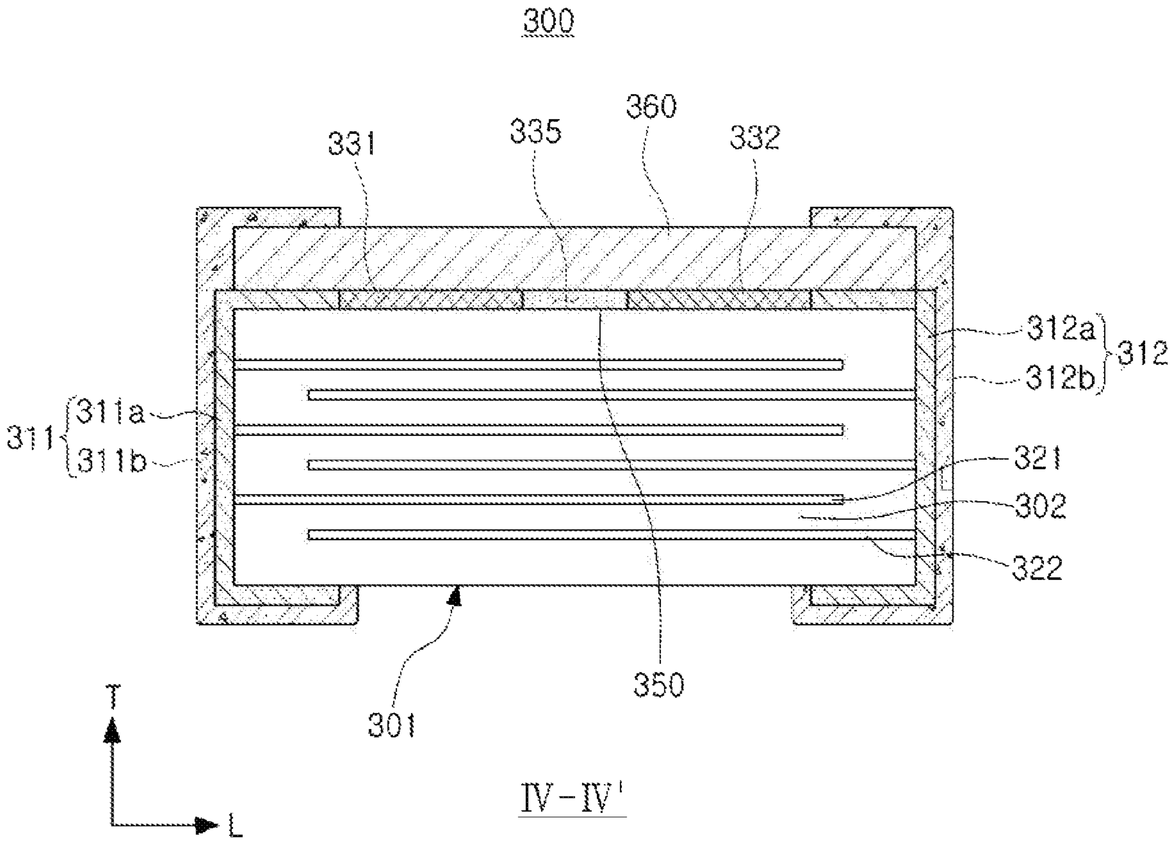
FIG. 7 is a cross-sectional view taken along line IV-IV' of FIG. 6.

FIG. 6 is a perspective view of a complex electronic component according to another exemplary embodiment, while FIG. 7 is a cross-sectional view taken along line IV-IV' of FIG. 6.

A description of a composition of a complex electronic component 300, according to the present exemplary embodiment, which is the same as that regarding complex electronic component 100, according to an exemplary embodiment described above, and a complex electronic component 200, according to a different exemplary embodiment, will be omitted.

With reference to FIGS. 6 and 7, plating layers 311*b* and 312*b* may extend from a portion exposed outwardly of a first external electrode 311 and a second external electrode 312 to be disposed to cover opposing surfaces of a cover layer 360 in a length direction. Furthermore, plating layers 311*b* and 312*b* may extend to cover portions of an upper surface of the cover layer 360 in a thickness direction.

As set forth above, according to an exemplary embodiment, an complex electronic component may include an ESD protection portion and include an ESD discharge layer disposed between a first discharge electrode and a second discharge electrode, thus improving durability of the ESD protection portion to withstand static electricity.

In addition, a distance between the first discharge electrode and the second discharge electrode is within a range of 30 μm to 60 μm. Therefore, in a case in which static electricity is generated, an electric current may be prevented from being concentrated, thus improving durability of the ESD protection portion to withstand static electricity.

While exemplary embodiments have been shown and described above, it will be apparent to those skilled in the art that modifications and variations could be made without departing from the scope of the present invention as defined by the appended claims.

What is claimed is:

1. A complex electronic component, comprising:

a body including a first external electrode and a second external electrode, disposed on an external surface of the body, and a laminate;

a plurality of first electrodes and a plurality of second electrodes disposed in the laminate to be stacked on each other in a thickness direction of the laminate perpendicular to a width direction of the laminate, the plurality of first electrodes and the plurality of second electrodes being electrically connected to the first external electrode and the second external electrode, respectively;

a third electrode and a fourth electrode disposed on the laminate to be spaced apart from each other in a length direction of the laminate perpendicular to the width and thickness directions of the laminate, the third electrode and the fourth electrode being electrically connected to the first external electrode and the second external electrode, respectively; and an electrostatic discharge (ESD) discharge layer disposed between the third electrode and the fourth electrode, wherein a ratio of a line width of the third electrode and the fourth electrode, in the width direction of the laminate, with respect to a width of the body is in a range of 0.2 to 0.5, inclusive.

2. The complex electronic component of claim 1, wherein the ESD discharge layer comprises at least one metal particle selected from a group consisting of aluminum (Al), copper (Cu), silver (Ag), and nickel (Ni) and combinations of Al, Cu, Ag, and Ni and at least one ceramic particle selected from a group consisting of silicon dioxide ($SiO_2$), zinc peroxide ($ZnO_2$) and combinations of $SiO_2$ and $ZnO_2$.

3. The complex electronic component of claim 2, wherein the at least one ceramic particle is 7.5 wt % to 12.5 wt % of the ESD discharge layer, based on a total weight of the ESD discharge layer.

4. The complex electronic component of claim 1, further comprising a cover layer disposed to cover the third electrode, the fourth electrode, and the ESD discharge layer.

5. The complex electronic component of claim 1, wherein a distance between the third electrode and the fourth electrode is within a range of 30 μm to 60 μm.

6. The complex electronic component of claim 1, wherein a dielectric layer extends in the thickness direction from a gap between the third and fourth electrodes to at least one of the first or second electrode.

7. The complex electronic component of claim 1, wherein the laminate includes at least one dielectric layer and the third and fourth electrodes are disposed on an outermost dielectric layer of the laminate in the thickness direction.

8. A complex electronic component, comprising:

a laminate including a first external electrode and a second external electrode disposed on an external surface of the laminate;

a first discharge electrode and a second discharge electrode, disposed on an upper surface of the laminate, connected to the first external electrode and the second external electrode, respectively, and disposed to be spaced apart from each other in a length direction of the laminate perpendicular to width and thickness directions of the laminate;

an ESD discharge layer disposed between the first discharge electrode and the second discharge electrode; and a cover layer disposed to cover an upper portion of the laminate in the thickness direction of the laminate, wherein a ratio of a line width of the first discharge electrode and the second discharge electrode, in the width direction of the laminate, with respect to a width of the laminate is in a range of 0.2 to 0.5, inclusive.

9. The complex electronic component of claim 8, wherein the first external electrode and the second external electrode comprise an electrode layer and a plating layer, and the plating layer is disposed in a portion exposed outwardly of the first external electrode and the second external electrode.

10. The complex electronic component of claim 9, wherein the plating layer extends from the portion exposed outwardly of the first external electrode and the second external electrode to cover opposing surfaces of the cover layer in the length direction.

11. The complex electronic component of claim 8, wherein a distance between the first discharge electrode and the second discharge electrode is within a range of 30 μm to 60 μm.

12. The complex electronic component of claim 8, wherein a content of a ceramic particle in the ESD discharge layer is 7.5 wt % to 12.5 wt % of the ESD discharge layer, based on a total weight of the ESD discharge layer.

13. The complex electronic component of claim 8, wherein the plating layer extends to cover portions of an upper surface of the cover layer in the thickness direction.

14. The complex electronic component of claim 8, wherein a dielectric layer extends in the thickness direction from a gap between the first and second discharge electrodes to an internal electrode in the laminate.

15. The complex electronic component of claim 8, wherein the laminate includes at least one dielectric layer and the first and second discharge electrodes are disposed on an outermost dielectric layer of the laminate in the thickness direction.

* * * * *